(12) United States Patent
Bate et al.

(10) Patent No.: US 12,286,239 B2
(45) Date of Patent: Apr. 29, 2025

(54) METHOD OF JOINING COMPONENTS OF AN AIRCRAFT STRUCTURE

(71) Applicant: AIRBUS OPERATIONS LIMITED, Bristol (GB)

(72) Inventors: Christopher Alan Bate, Bristol (GB); Tim Jones, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 18/414,187

(22) Filed: Jan. 16, 2024

(65) Prior Publication Data

US 2024/0150038 A1  May 9, 2024

Related U.S. Application Data

(63) Continuation of application No. 17/982,960, filed on Nov. 8, 2022, now Pat. No. 11,905,039.

(30) Foreign Application Priority Data

Nov. 9, 2021  (GB) .................................... 2116100

(51) Int. Cl.
*B64F 5/10* (2017.01)

(52) U.S. Cl.
CPC ..................... *B64F 5/10* (2017.01)

(58) Field of Classification Search
CPC .......... B64F 5/10; B64F 5/00; B23P 2700/01; B23P 2700/00; B23P 19/10; B23P 19/00; B23P 11/00; F16B 37/14; F16B 37/00; F16B 5/0642; F16B 5/0614; F16B 5/607; F16B 5/03; F16B 5/00; F16B 5/0208; F16B 5/02; B23B 49/02; B23B 49/00
See application file for complete search history.

(56) References Cited

U.S. PATENT DOCUMENTS

| | | | | |
|---|---|---|---|---|
| 2,516,554 A * | 7/1950 | Coyne | ................. | F16B 19/1063 |
| | | | | 411/51 |
| 5,404,641 A * | 4/1995 | Bratten | ................. | B23B 41/00 |
| | | | | 29/458 |
| 10,533,597 B2 * | 1/2020 | Benthien | ............... | F16B 37/085 |
| 11,732,744 B2 * | 8/2023 | Osborne | ............... | F16B 5/0208 |
| | | | | 411/386 |
| 2017/0350437 A1 * | 12/2017 | Benthien | ............... | F16B 37/085 |
| 2020/0256375 A1 * | 8/2020 | Osborne | ............... | F16B 5/0258 |

FOREIGN PATENT DOCUMENTS

| | | | | |
|---|---|---|---|---|
| CN | 106514259 B | | 7/2018 | |
| GB | 2586034 A | * | 2/2021 | ............ F16B 37/044 |

OTHER PUBLICATIONS

Combined Search and Examination Report for GB Application No. 2116100.5 dated Aug. 12, 2022, 9 pages.

* cited by examiner

*Primary Examiner* — Lawrence Averick
(74) *Attorney, Agent, or Firm* — Nixon & Vanderhye P.C.

(57) ABSTRACT

Two components of an aircraft structure are joined by providing a threaded opening in one of them and supporting an alignment insert in that opening. The alignment insert is used to guide drilling of the second component such that a hole is produced which is aligned with the threaded opening, for instance using an alignment projection which physically guides a drill. The alignment insert may then be removed. A fastener is then inserted through that hole and into the threaded opening, then tightened to form the completed joint.

20 Claims, 12 Drawing Sheets

METHOD OF JOINING COMPONENTS OF AN AIRCRAFT STRUCTURE

CROSS RELATED APPLICATION

This application is a Continuation of U.S. patent application Ser. No. 17/982,960, filed Nov. 8, 2022, now allowed; which claims priority to United Kingdom Patent Application GB2116100.5 filed Nov. 9, 2021, the entire contents of each of which is hereby incorporated by reference.

BACKGROUND OF THE INVENTION

The present disclosure relates to the field of aircraft manufacture.

The present invention concerns methods of joining components of an aircraft structure. More particularly, but not exclusively, this invention concerns joining first and second components using a threaded fastener, after using an alignment insert located in a threaded bore to guide the drilling of a second component to be joined thereto so that the hole in that component is aligned correctly. The invention also concerns a kit of parts for performing such a method, an aircraft or part of an aircraft produced using the method and/or the kit of parts, and a method of attaching a first part of an aircraft structure to a second part of an aircraft structure.

Threaded fasteners such as bolts are used routinely when joining components during the manufacture of aircraft. Conventionally such fasteners are used by jigging together the components to be joined, match drilling them, inserting the fastener through the hole and into a nut, then tightening the nut and fastener to secure the joint. However, this requires access on both sides of the joint to tighten the fastener. In some spaces, for instance when the fastener passes into the wing tank of the aircraft, that access may not be possible (or conversely many constraints may be placed on aircraft design if they must be shaped to allow access on both sides). In other situations access may be possible, but may require those assembling the aircraft to work tight spaces or in other ergonomically difficult conditions such as spaces with difficult ingress/egress points.

This need for access can be mitigated by providing one of the components to be joined with a threaded opening, for instance by tapping a hole in it or by attaching a nut to it. However, this approach requires holes to be formed in the other components which align precisely with that threaded opening so that the fastener can pass through the holes and into the threaded opening before being tightened. Manufacturing variation can lead to those holes being misaligned, leading to wastage or requiring ad-hoc adjustments to be made to compensate.

This problem, in turn, can be addressed by positioning the components in their desired position, for instance using jigs and the like, drilling them, then disassembling them to form the threaded opening. Particularly for larger pieces of aircraft structure this procedure can be very arduous, adding considerably to overall production time. Further, in some cases it is possible for components to shift position slightly at some point during the drilling, disassembly, opening forming and reassembly process, resulting in misaligned holes once again.

The present invention seeks to mitigate one or more of the above-mentioned problems. Alternatively or additionally, the present invention seeks to provide an improved or alternative method of joining first and second components of an aircraft structure, kit of parts, aircraft or part of aircraft, and method of attaching a first part of an aircraft structure to a second part of an aircraft structure.

SUMMARY OF THE INVENTION

According to a first aspect of the invention there is provided a method of joining first and second components of an aircraft structure, the method comprising:
  providing a threaded opening in the first component;
  attaching an alignment insert to the threaded opening;
  locating the second component in a required position relative to the first component;
  using the alignment insert to guide drilling of a hole in the second component; and
  inserting a threaded fastener through the hole in the second component and into the threaded opening, and tightening the fastener to join the first and second components.

This method can avoid the need for the components to be positioned, drilled, then disassembled to form the threaded opening and then reassembled. It can therefore allow for more time-efficient, and thus cheaper, production of aircraft structures. Further, the guidance provided by the alignment insert can reduce or eliminate the risk of the hole in the second component being misaligned with the threaded opening, thereby reducing or eliminating the wastage or lost time discussed above.

The first component may be, for example, a fitting for a wing pylon such as an upper fitting positioned in a wing tank. The second component may be, for example, a wing skin.

The alignment insert may be threaded, and screw into the threaded opening to attach thereto. As an alternative, the alignment insert may have a cylindrical portion sized to tightly engage the threaded opening and be retained under friction.

The fastener may have an integral head, for instance the fastener may be a bolt or a machine screw. In such a case, tightening the fastener may comprise inserting the fastener further into the threaded opening until it is tight. As an alternative, the fastener may be a threaded stud with a nut, whereupon tightening the fastener may comprise moving the nut along the threaded stud until it is tight, instead of or as well as inserting the stud further into the threaded opening.

The drilling of the second component may be controlled so that it does not travel beyond a predetermined point, i.e. so that the drill does not over-penetrate. This control may be provided in any suitable fashion, for instance through electronic servo-control, via visual feedback or using abutting stop surfaces.

Said components may be parts of a wing assembly.

For example, the first component may be a fitting such as a fitting for an engine pylon, and the second component may be a skin of the wing of the wing assembly. As another example, the first component may be a fitting for a flap assembly and the second component may be a wing spar.

The wing assembly of an aircraft may be a part where it is particularly difficult to access both sides of a joint. Accordingly, the advantages discussed above may be of particular benefit.

As an alternative, said components may be part of a tail assembly, a rudder assembly or a landing gear structure, for example.

The step of providing a threaded opening in the first component may include fixing a nut to the first component.

For instance, the nut may be a captive nut which may for example be press-fitted into a hole in the first component.

This can be more time-efficient and/or offer a stronger joint than other ways of providing a threaded opening, for instance tapping a hole in the first component.

Optionally:
the method further comprises match-drilling the first component and a third component to form holes therein;
the threaded opening is provided in said hole in the first component; and
said fastener is inserted into the threaded opening through said hole in the third component as well as through the hole in the second component.

The match-drilling operation can ensure that the hole in the third component is aligned correctly with the location on the first component where the threaded opening will be provided, without requiring the third component to be drilled under guidance from the alignment insert (which may be slower and/or may place additional constraints on the design of the alignment insert or associated components).

The third component may be, for example, a further fitting for a wing pylon such as a lower fitting.

The fastener may be inserted into the threaded opening through said hole in the third component and then through the hole in the second component. As an alternative, the fastener may be inserted into the threaded opening through the hole in the second component and then through the hole in the third component.

In other embodiments with a third component, the second and third components may be processed together (for example they may be secured together in their required positions and drilled as one, under guidance of the alignment insert). In such a case the joint may be considered to have first, second and third components, or may alternatively be considered to have a first component, and a second component made up of two parts.

For the avoidance of doubt, in other embodiments with a third component, the third component may be drilled (where necessary) in any other suitable fashion. For example, it may be provided with a slot or a set of holes so as to accommodate potential alignment, or may be drilled after drilling of the second component, using the hole in the second component as a guide.

The method may further comprise attaching an alignment projection to the alignment insert so that the alignment projection can extend through a pilot hole in the second component, the alignment insert guiding the drilling of the second component via the alignment projection.

The alignment projection extending through the pilot hole can make the alignment projection, and thus the guiding action provided by the alignment insert, more accessible. For example, a component for assisting with drilling alignment which would not fit within the threaded hole and/or the pilot hole may be provided on the distal end of the alignment projection as discussed below.

As an alternative, the alignment insert may have an alignment projection integrally formed therewith. As another alternative, no alignment insert may be provided. In such circumstances the second component may or may not have a pilot hole.

The alignment projection may be attached to the alignment insert before or after the alignment insert is attached to the threaded opening.

The alignment insert may support the alignment projection in a bore. As an alternative, the alignment insert may have a protrusion received in a recess in the alignment projection.

The alignment insert may have a first thread for engaging the threaded opening, and a second thread for engaging the alignment projection, the first and second threads running in opposite directions.

In other words, the alignment insert may be attached to the threaded opening by rotating it in one direction, and the alignment projection may be attached to the alignment insert by rotating it in the opposite direction.

This can allow the alignment insert to be removed from the threaded opening, for instance after drilling of the second component, by 'over-tightening' the alignment projection (which may be more accessible) in a manner akin to a broken screw extractor.

As an alternative, the first and second threads may run in the same direction. As another alternative, there may be no second thread and the alignment projection may engage the alignment insert in a different fashion, for instance via an interference fit.

The alignment projection may physically guide the drill drilling the hole in the second component.

This can be an advantageously simple, and therefore quick, cheap and/or rugged way in which the alignment projection can guide drilling.

The drilling of the hole in the second component may be performed using a drill which has an annular cutting edge encircling a central bore, the alignment projection being received within the bore of the drill during said drilling.

This can be an advantageously simple, rugged or mechanically stable way of physically guiding the drill, and/or one which is less vulnerable to vibration during drilling.

The alignment projection may engage the alignment insert via an alignment projection thread, and the drill may rotate in the same direction as the alignment projection thread.

In other words if the alignment projection thread is a right hand thread then the drill rotates clockwise, or conversely if the alignment projection thread is a left hand thread then the drill rotates anticlockwise.

This can avoid torque passed to the alignment projection from the drill through friction from unscrewing the alignment projection from the alignment insert. Instead, any torque transferred from the drill to the alignment projection may serve to tighten it.

As an alternative, the drill may rotate in the opposite direction to the alignment projection thread. In such a case the alignment projection may be screwed into the alignment insert sufficiently tightly that any torque from frictional engagement with the drill would not be sufficient to loosen it.

The central bore of the drill and the alignment projection may each define respective stop surfaces, the stop surfaces abutting one another after drilling of the second component so as to prevent the drill from over-penetrating.

This can provide a simple and reliable way of preventing the drill over-penetrating (which may damage the alignment insert and/or the threaded opening, for instance).

As some alternatives, over-penetration of the drill could instead be avoided using a manual depth stop contacting a surface of the second component which faces towards the drill, through appropriate depth control of a CNC drill, or based on axial reaction force experienced by the drill.

The stop surfaces may, for example, be respective end faces of the bore and the alignment projection. As an alternative, they may be respective shoulders provided part way down the bore and the alignment projection.

The drilling of the second component may use a drill comprising an annular cutting edge encircling a non-cutting projection, the non-cutting projection passing through a pilot hole in the second component and being guidingly received in the alignment insert during drilling of the second component.

This can provide a simple and reliable way of guiding the drill without requiring an alignment projection, which may be vulnerable to knocks which may damage the alignment member, the alignment insert or the first and/or second components. Instead or as well, the lack of need for an alignment projection (or several alignment projections in the case of many joints being formed in parallel) can in of itself cut down on costs and/or eliminate any delay caused by the need to attach the alignment projection(s) to the alignment insert(s).

The non-cutting projection may be rotatable relative to the annular cutting edge. This can allow the non-cutting projection to rotate more slowly, or not at all, when received by the alignment insert. This, in turn, can reduce wear and/or frictional heating produced by the non-cutting projection rotating within the alignment insert.

In any method where the second component has a pilot hole, the pilot hole may be at least 1 mm, for instance at least 2 mm or at least 3 mm smaller than a diameter of the threaded opening (for instance the maximum diameter of the threaded opening, including the radial extent over which the threads are provided). Instead or as well, the pilot hole may be no more than 90%, for instance no more than 80% or no more than 75% of a diameter of the threaded recess.

It can be advantageous for the pilot hole to be noticeably smaller than the threaded opening, since a greater degree of misalignment between pilot hole and threaded opening can be accommodated without the pilot hole extending outside the footprint of the threaded opening (at which point after drilling the hole in the second component would be non-circular).

The pilot hole may be no more than 6 mm, for instance no more than 5 mm or no more than 4 mm, smaller than the diameter of the threaded opening. Instead or as well, the pilot hole may be at least 40%, for instance at least 50% or at least 60% of the diameter of the threaded opening.

It can be advantageous for the pilot hole to nonetheless be a considerable proportion of the side of the threaded opening. A pilot hole that is too small relative to the threaded opening could mean that less misalignment could be tolerated before an alignment projection that is concentric to the threaded opening would be unable to project through the pilot hole.

The non-cutting projection may define a stop surface and the alignment insert or the first component defines another stop surface, the stop surfaces abutting one another after drilling of the second component so as to prevent the drill from over-penetrating.

This can provide a simple and reliable way of preventing the drill over-penetrating (which may damage the alignment insert and/or the threaded opening, for instance).

As some alternatives, over-penetration of the drill could instead be avoided using one of the methods described above.

The stop surfaces may, for example, be an end face of the non-cutting projection and a narrowed waist or a 'roof' provided in the alignment insert, in a nut attached to the second component, or in a nut cap positioned over such a nut.

The non-cutting projection of the drill may be axially movable between extended and retracted positions relative to the annular cutting edge, and the non-cutting projection moves from the extended position to the retracted position in the course of drilling of the second component.

Drilling beginning with the non-cutting projection in the extended position can allow more of the non-cutting projection to be received by the alignment insert, and thus the guiding of the alignment insert to be stronger and/or more stable, before the annular cutting edge contacts the second component.

The non-cutting projection moving to the retracted position during drilling can allow the length of travel of the annular cutting edge to be greater than that of the non-cutting projection. This, in turn, can reduce the risk of the non-cutting projection "bottoming out" (on a stop surface provided by the alignment insert or part of the first component, for example) before the annular cutting edge has fully penetrated the second component, thereby removing design constraints which would otherwise be placed on the drill and/or alignment insert.

The alignment insert may support an optical target structure and drilling of the second component is performed by a drill using a guidance system, the guidance system controlling the path of the drill based on orientation information provided by the optical target structure.

This can allow the method to be performed using existing precision drilling equipment set up to be aligned using an optical target structure, rather than requiring a plant to invest in new machinery (for instance a drill with annular cutting edge encircling a central bore, or a drill with an annular cutting edge encircling a non-cutting projection, as described above) in order to perform the method.

As an example, the guidance system may identify a drilling axis based on the position and orientation of one or more optical targets provided by the optical target structure, and then move the drill along said axis to drill the second component. As an alternative, the optical target structure may include a laser diode emitting a laser beam along a drilling axis and the guidance system may use a movable light sensor to determine the orientation of that axis and then move the drill along said axis to drill the second component.

The optical target structure may, or may not, take the form of an alignment projection as described above.

The alignment insert may support a magnet and drilling of the second component may be performed by a drill which using a guidance system, the guidance system controlling the path of the drill base on a sensed location of the magnet.

This can allow the method to be performed using existing precision drilling equipment set up to be aligned to drill towards a magnet, rather than requiring a plant to invest in new machinery (for instance a drill with annular cutting edge encircling a central bore, or a drill with an annular cutting edge encircling a non-cutting projection, as described above) in order to perform the method.

As an example, the guidance system may drill a hole that is normal to a surface of the second component which faces away from the first component, in a direction which intersects the centre of the magnet.

Drilling of the second component may be performed by orbital drilling.

This can allow drilling of multiple different size holes to be performed using a single drill, by varying the orbital motion of the cutting bit. Instead or as well, this form of drilling can be beneficial where the second component has a pilot hole, which may be misaligned, as conventional drilling techniques can be vulnerable to the drill bit slipping into the pilot hole rather than following its intended path.

The method may further comprise the step of removing the alignment insert from the threaded opening after drilling the hole in the second component and before inserting the fastener.

This can reduce parts wastage and/or provide a lighter joint.

As an alternative, insert might be short enough relative to the threaded opening such that it can be left in place and the fastener inserted behind it.

The alignment insert may be attached to the threaded opening such that it is recessed relative to a surface of the first component which faces towards the second component when joined thereto.

This may provide a space beneath the alignment insert into which a drill can 'break through' without drilling into the alignment insert and damaging it.

The alignment insert may be recessed behind said surface by at least 0.2 mm, for instance at least 0.5 mm or at least 0.8 mm. Instead or as well, the alignment insert may be recessed behind said surface by no more than 10 mm, for instance no more than 5 mm or no more than 2 mm.

As an alternative, the alignment insert may be flush with said surface or may even stand proud of said surface, in which case it may be cut by the drill to some extent. The alignment insert may be a disposable component which is discarded after a single drilling operation, or the alignment insert may be reusable despite having been damaged by previous drilling (for instance it may be longer than necessary, so as to account for gradual shortening by drilling over successive uses).

In methods where the threaded opening is provided by a nut, the nut may be fixed to the first component such that it is recessed relative to a surface of the first component which faces towards the second component when joined thereto. This may provide a space beneath the nut into which the drill can break through without drilling into the nut and damaging it or loosening its fixing to the first component.

The nut may be recessed behind said surface by at least 0.2 mm, for instance at least 0.5 mm or at least 0.8 mm. Instead or as well, the nut may be recessed behind said surface by no more than 10 mm, for instance no more than 5 mm or no more than 2 mm.

The method may further comprise the step of applying a cover to the threaded opening and/or the alignment insert, then applying a treatment to the first component or to both the first and second components. The treatment may be applied before or after the second component is located in the required position. The treatment may be applied before or after drilling of the hole in the second component.

The treatment may be the application of a sealant. As an alternative, the treatment may be the application of a layer of primer or paint.

The method may further comprise removing said cover before curing of the treatment.

The cover may protect the threaded opening and/or alignment insert from obstruction of its proper function by the treatment. For instance, the cover may protect threads of the threaded opening and/or alignment insert so that the threads are not clogged by the treatment.

According to a second aspect of the invention there is provided a kit of parts for performing a method according to the first aspect of the invention, the kit comprising the nut, the alignment insert and the fastener, the alignment insert and the fastener each having threads configured for engagement with the threaded opening of the nut.

The kit of parts may also comprise the first component and/or the second component. Instead or as well it may comprise, where present, an alignment projection, drill, optical target structure and/or magnet as described above. Instead or as well, it may comprise any other component described herein.

The kit of parts may enable a method according to the first aspect of the invention to be carried out, thereby providing one or more of the advantages discussed above.

According to a third aspect of the present invention there is provided an aircraft or part of an aircraft, comprising first and second components joined using the method of the first aspect of the invention and/or the kit of parts according to the second aspect of the invention.

An aircraft or part of an aircraft so produced can be cheaper due to one or more of the advantages discussed above in relation to reduced wastage and/or faster production.

According to a fourth aspect of the present invention there is provided a method of attaching a first part of an aircraft structure to a second part of an aircraft structure, the method comprising:

providing a female set of threads on the first part;
mounting a drill guide to the female set of threads;
introducing the second part to the first part;
drilling a hole in the second part, in a position determined by the drill guide;
inserting a joining member with a male set of threads into the female set of threads through the hole in the second part; and
tightening the joining member to clamp the first and second parts together.

Also disclosed herein is a method of method of joining first and second components of an aircraft structure, the method comprising:

fixing a nut to the first component so as to provide a threaded opening therein;
locating the second component in a required position relative to the first component; and
using a drill to drill a hole through the second component, in a direction towards the threaded opening.

The method may further comprise stopping drilling once the drill reaches the first component, for instance before the drill touches the first component (for example the nut of the first component).

For the avoidance of doubt, the term 'drilling' is used herein to describe the making of a hole, and is not intended to be otherwise limited. Similarly, reference herein to a drill is used to describe a tool which can make a hole. Tools and/or processes which make a hole are therefore considered to be drills or drilling within the meaning used herein. Accordingly, the term 'drilling' may be interpreted to mean 'the making of a hole' and the term 'a drill' may be interpreted to mean 'a tool for making a hole'. Actions such as grinding and laser cutting holes therefore constitute drilling, and the tools which perform those actions constitute drills.

It will of course be appreciated that features described in relation to one aspect of the present invention may be incorporated into other aspects of the present invention. For example, the method of the invention may incorporate any of the features described with reference to apparatus of the invention and vice versa. Further, it is to be noted that methods described herein are not intended to be limited to the steps of those methods being performed in the order in which they are recited. It would be readily apparent to the skilled person where steps can, or cannot, be performed in a different order.

DESCRIPTION OF THE DRAWINGS

Embodiments of the present invention will now be described by way of example only with reference to the accompanying schematic drawings of which.

DETAILED DESCRIPTION

Figure 1:
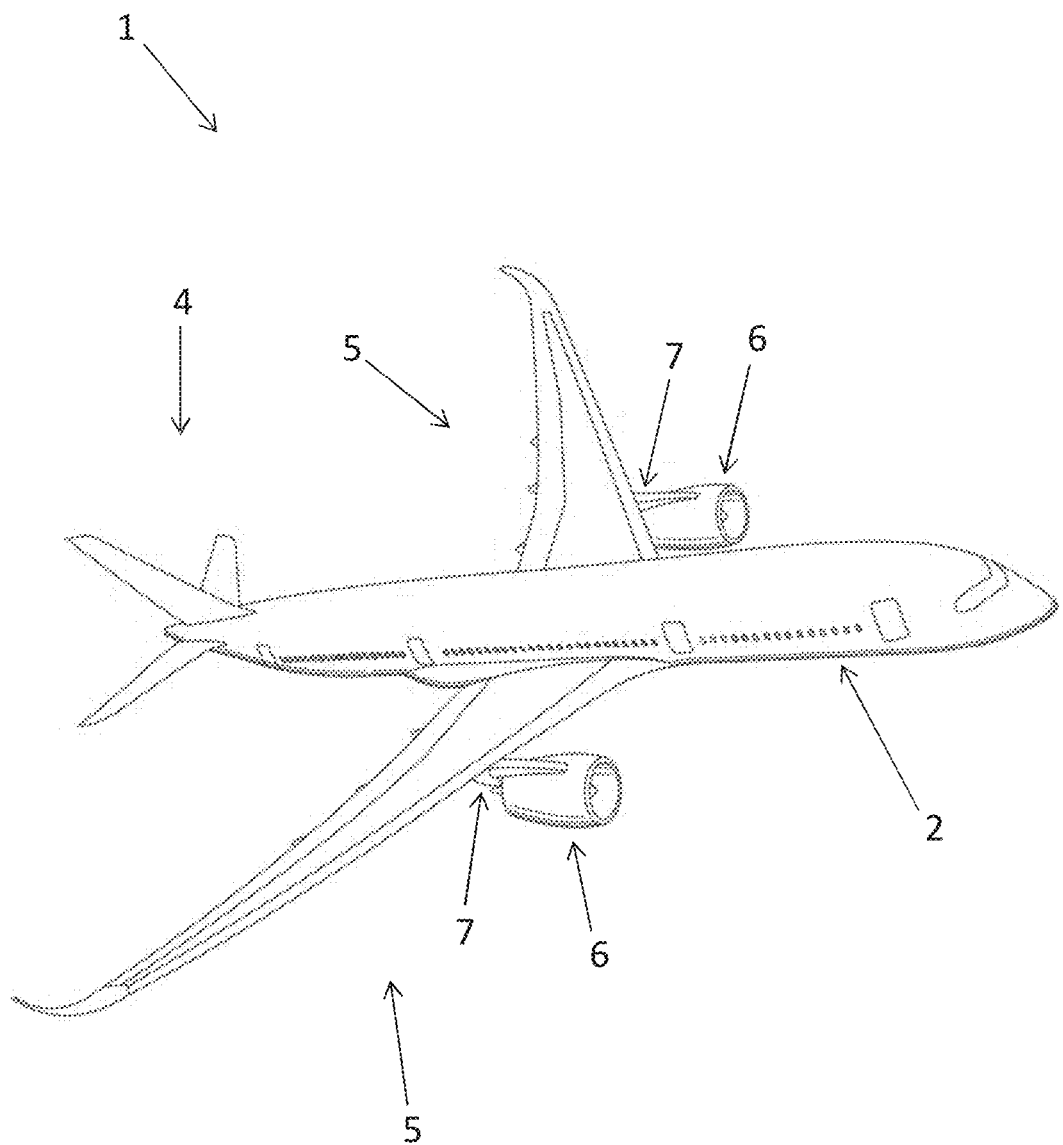
FIG. 1 shows a perspective view of an aircraft according to a first embodiment of the invention.

FIG. 1 shows an aircraft 1 according to an embodiment of the invention. It has a body 2, a tail 4 and two wing assemblies 5. Each wing assembly 5 has an engine 6 mounted thereto via an engine pylon 7. The pylon 7 of each wing assembly 5 is mounted via a set of fittings.

Figure 2:
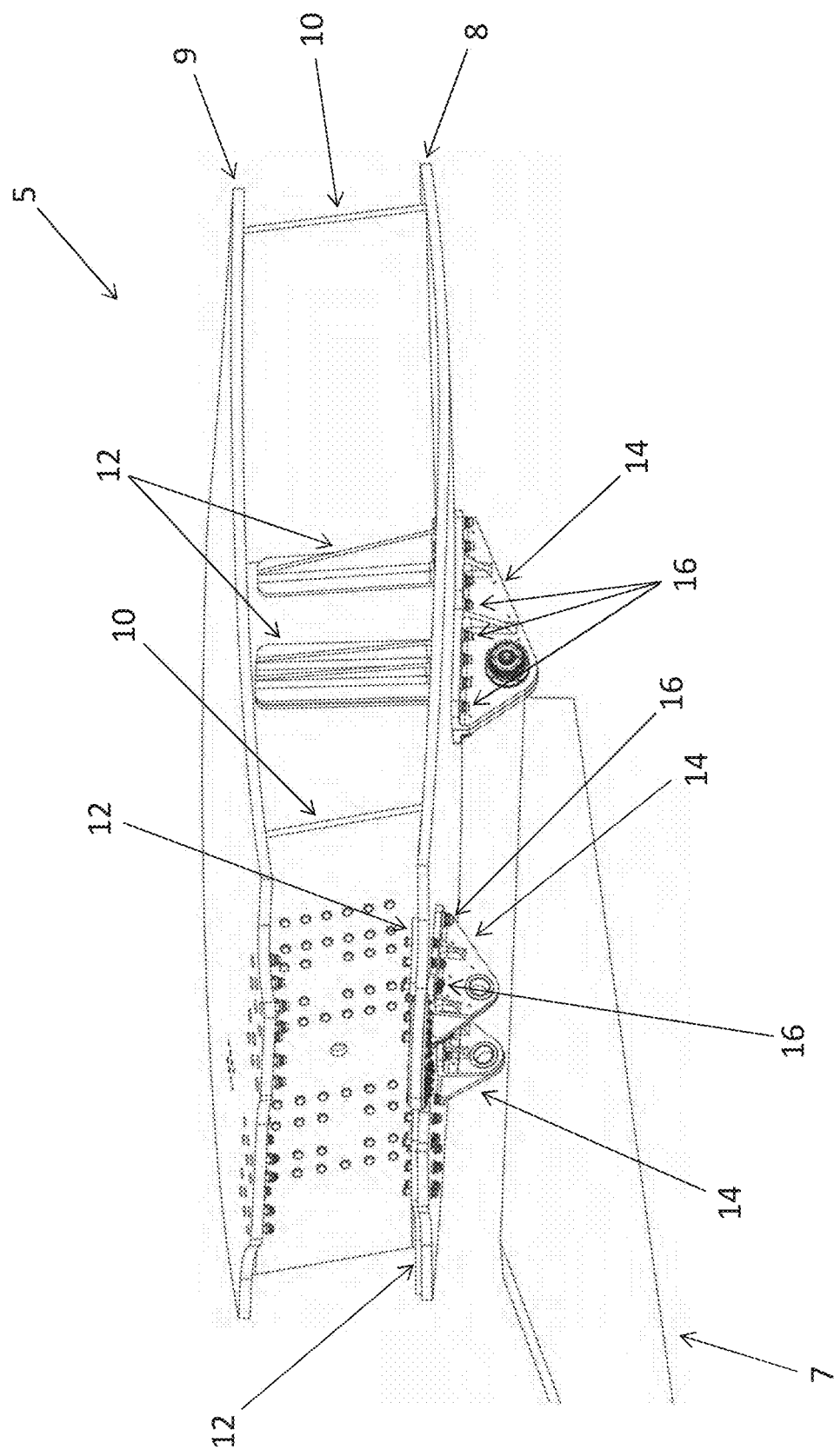
FIG. 2 shows cross-sectional view of part of a wing assembly of the aircraft of FIG. 1.

FIG. 2 shows the fittings of one of the pylons 7 in situ, along with a lower wing skin 8, upper wing skin 9 and front and rear spars 10 of the associated wing assembly 5. There are two pairs of upper fittings 12 towards the front of the wing assembly 5 (to the left from the perspective of FIG. 2, one of each pair being hidden behind the front spar 10) and a further pair of upper fittings 12 towards the rear of the wing assembly 5. Each pair of upper fittings 12 is joined to a lower fitting 14, and to the lower wing skin 8 which is sandwiched between the upper and lower fittings 12, 14, by a set of threaded fasteners 16 in the form of bolts. The pylon 7 is mounted to the lower fittings 14, and thus to the remainder of the wing assembly, by a pylon attachment structure (not shown).

It is noteworthy that the pair of upper fittings 12 towards the rear of the wing assembly 5 (and the upper fittings 12 which are hidden behind the front spar 10) are positioned between the lower and upper wing skins 8, 9, i.e. in the 'wing tank'. This makes them difficult to be accessed by a technician, and thus conventional fasteners (which require access on both sides of the joint) are not suitable for joining them to the lower skin 8 and lower fitting 14. Instead, they are joined using a method according to the present embodiment, as described below.

Within the meaning of the present invention, each of the upper fittings 12 towards the rear of the wing assembly 5 are examples of a first component, the lower wing skin 8 is an example of a second component, and the lower fitting 14 is an example of a third component. For the sake of clarity, only parts of said components are shown in the following figures. Similarly, multiple similar joints are formed using the method to join these components, but the formation of a single joint will be described below for the sake of clarity.

Figure 3:
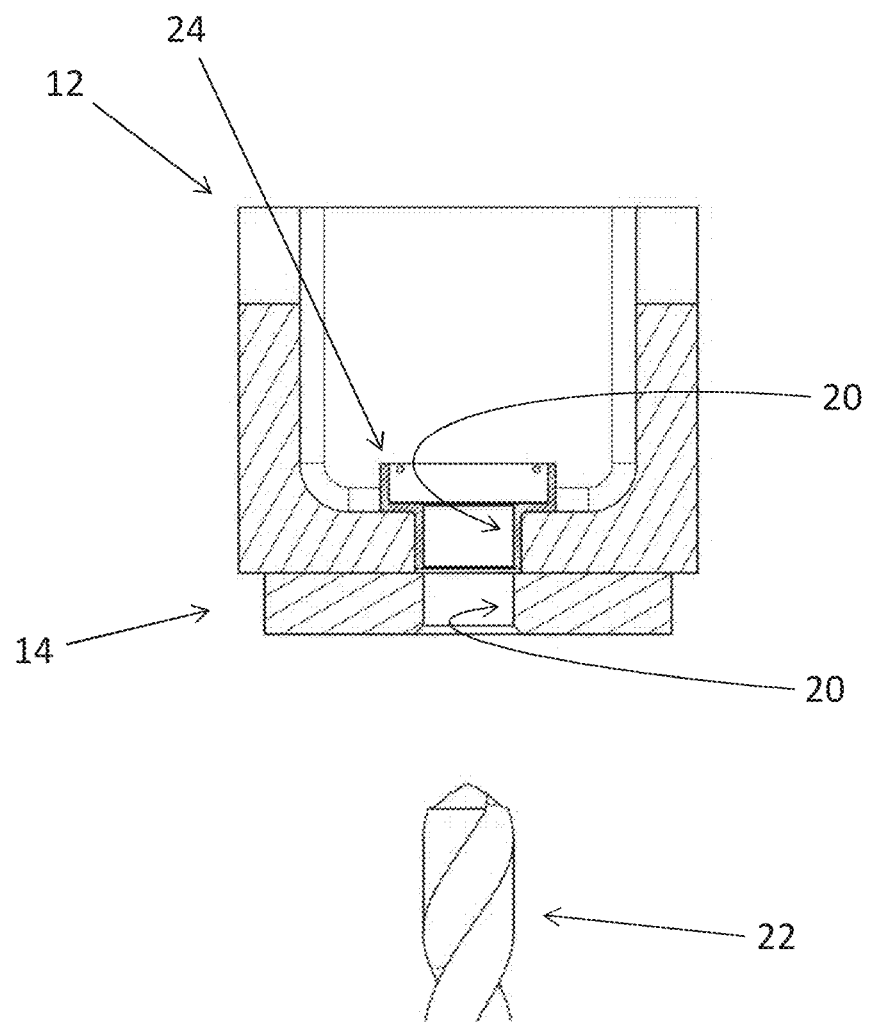
FIG. 3 shows a cross-sectional view of a match drilling step of an upper fitting and a lower fitting of the wing assembly of FIG. 2.

As illustrated in FIG. 3, the first step of the method is match-drilling holes 20 in the upper and lower fittings 12, 14. The upper and lower fittings 12, 14 are moved to the position relative to one another that they would occupy in the finished wing assembly 5, but before the components of the wing assembly 5 are assembled and access becomes difficult, then a drill bit 22 is passed through them to form holes 20 in those components which are correctly aligned with one another. In the case of the upper fitting 12, the hole 20 is made in a shoulder bushing 24 which has been press-fitted into an aperture in the upper fitting, whereas in the case of the lower fitting no such shoulder bushing is provided.

Figure 4:
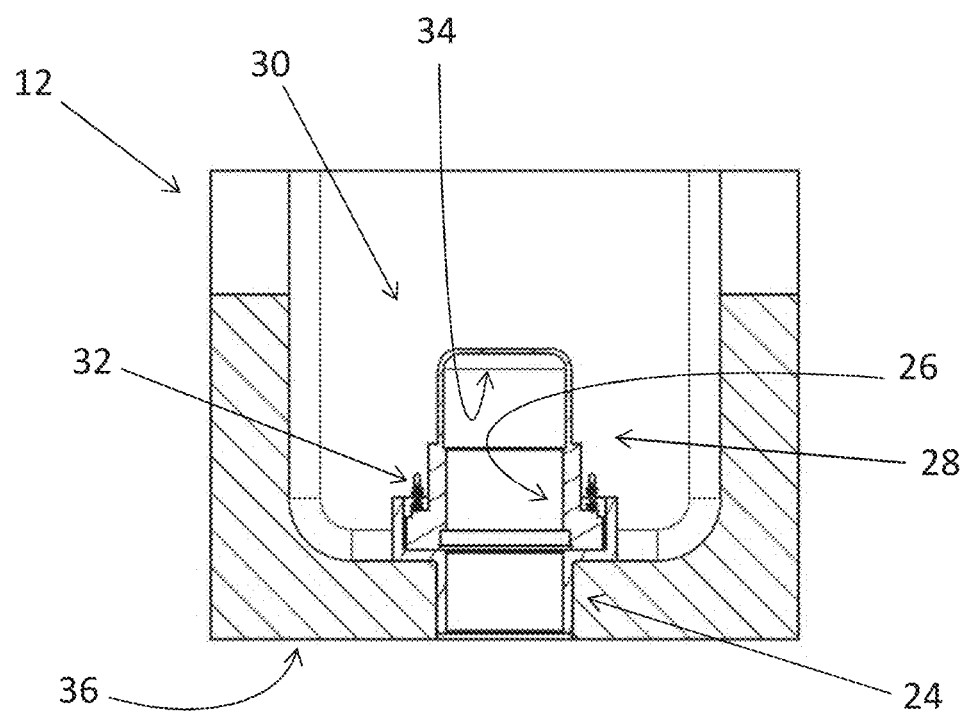
FIG. 4 shows a cross-sectional view of the upper fitting of FIG. 3, with a captive nut attached thereto.

The next step is to form a threaded opening in the upper fitting 12. In this embodiment, as shown in FIG. 4 the threaded opening 26 is provided by a right hand female thread located in a nut cap 28 which is fixed to the shoulder bushing 24, and thus to the upper fitting 12, thereby forming a captive nut 30 which in effect becomes part of the upper fitting. In this specific case the nut cap 28 is held in the shoulder bushing 24 by cross pins 32. The captive nut 30 has a roof 34 provided by the nut cap 28. The shoulder bushing 24, and thus the captive nut 30 as a whole, is fixed such that it is recessed around 1 mm behind the lower surface 36 of the upper fitting 12.

At this point, a layer of sealant putty (not shown) is applied over the top of the captive nut 30 so as to prevent any leakage of fluid (for instance air, fuel or hydraulic fluid) through the upper fixing 12.

Figure 5:
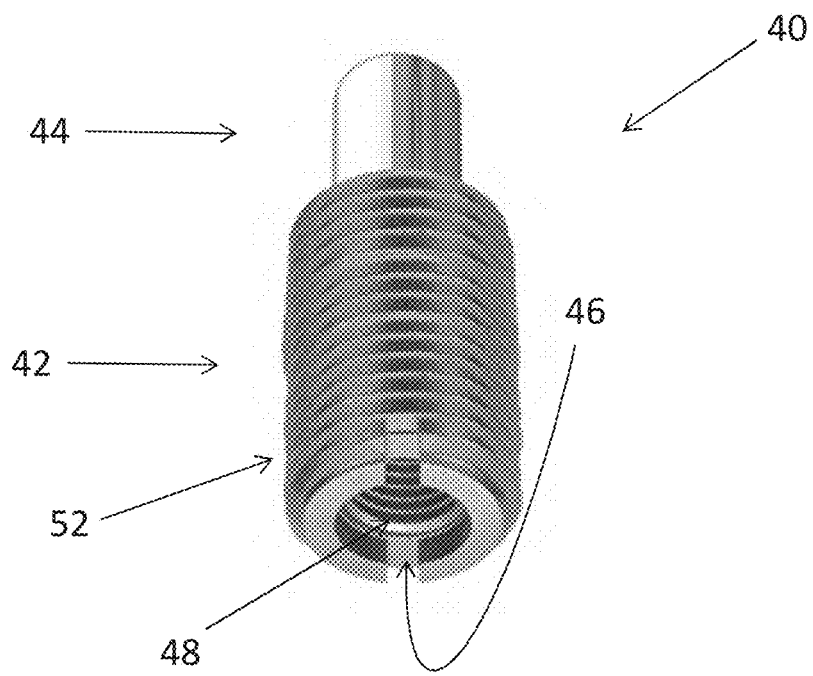
FIG. 5 shows a perspective view of an alignment insert for attachment to the upper fitting.
Figure 6:
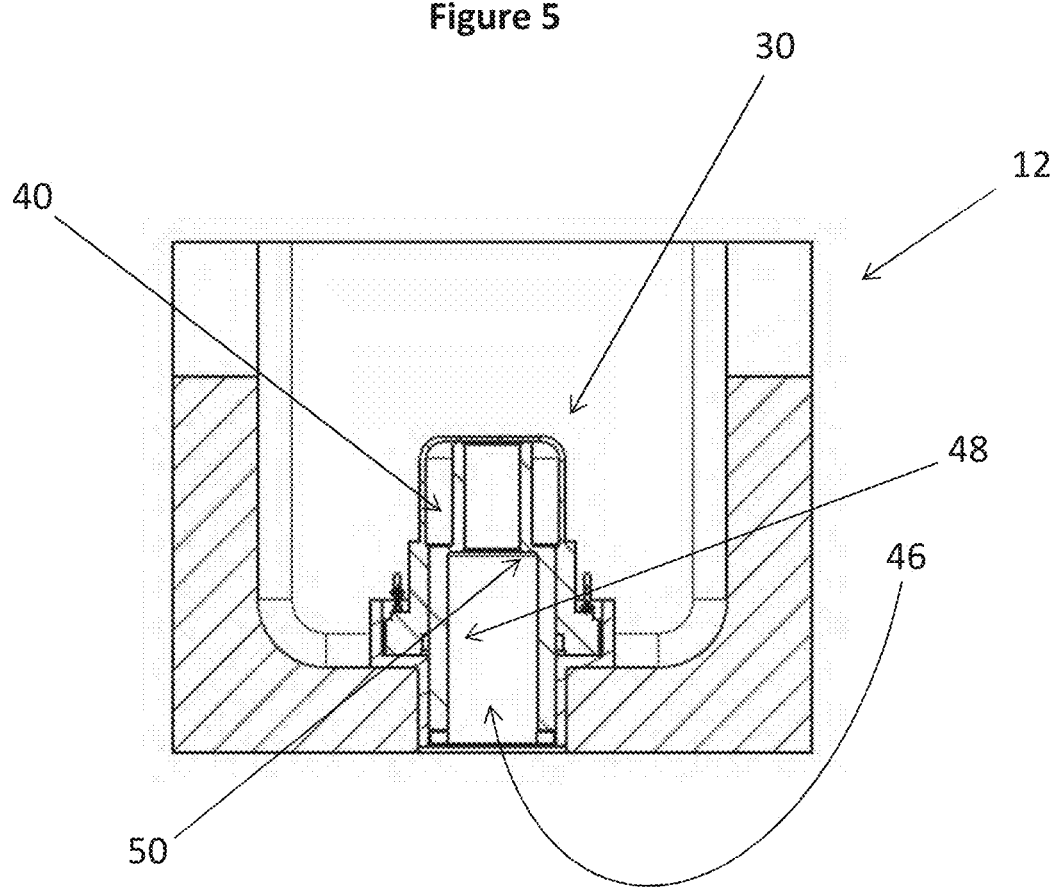
FIG. 6 shows a cross-sectional view of the alignment insert of FIG. 5, attached to the captive nut of the upper fitting.

So that the lower wing skin 8 (and the lower fixing 14) can be joined to the upper fixing 12, a hole must be drilled through it which is aligned with the threaded opening 26 of captive nut 30 (and thus of the upper fitting 12). An alignment insert is attached to the threaded opening 26 and used to guide the drilling of the hole in the lower skin 8 so that the hole is positioned correctly. FIGS. 5 and 6 show the alignment insert 40, in isolation and in situ in the captive nut 30, respectively.

The alignment insert 40 has a wider portion 42 and a narrower portion 44. A first thread in the form of a right hand male thread 52 is provided around the outside of the wider portion 42. A bore 46 runs up the centre of the alignment insert 40. The part of the bore 46 within the wider portion 42 has a second thread in the form of a left hand female thread 48, whereas the part of the bore 46 within the narrower portion 44 is smooth. Said parts of the bore 46 meet at a shoulder 50.

Before the lower skin 8 is drilled, the alignment insert 40 is inserted into the threaded opening 26, with the male thread of the alignment insert 40 engaging the female thread of the opening 26 so as to attach it. The alignment insert 40 is inserted until the end of the narrower portion 44 contacts the roof 34 of the captive nut 30. In this position, the alignment insert 40 is recessed around 1 mm behind the lower surface 36 of the upper fitting 12.

Also before the lower skin 8 is drilled, it is provided with an undersized pilot hole the purpose of which will be discussed below. Furthermore, in this embodiment a layer of sealant is provided between the upper fitting 12 and the lower wing skin 8. To prevent the sealant seeping into the female thread 48 of the alignment insert 40, a cover in the form of a plug (not shown) is inserted into the bore 46 so as to cover the thread 48.

Figure 7:
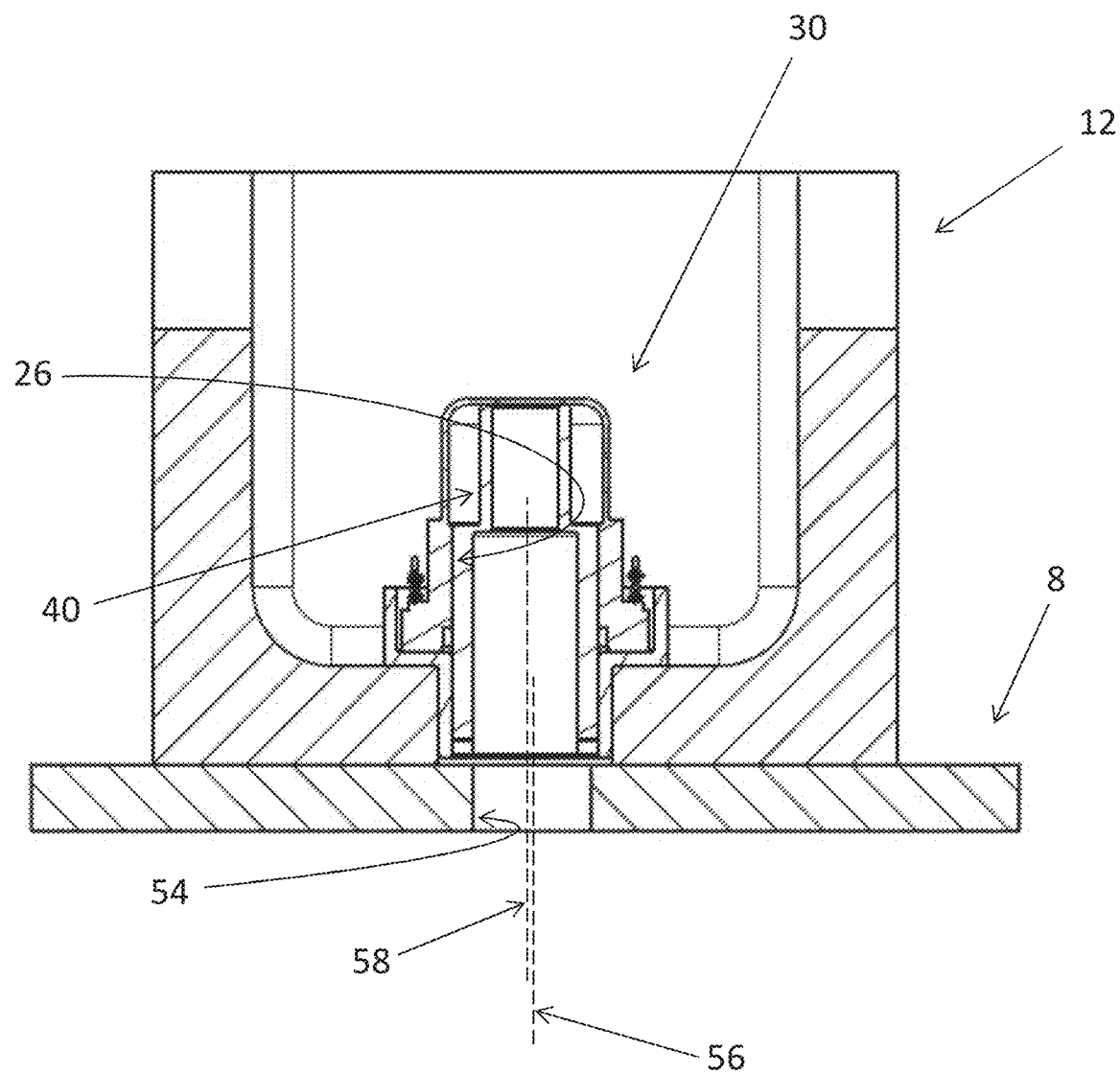
FIG. 7 shows a cross-sectional view of the upper fitting, with a lower wing skin with a pilot hole introduced thereto.

With the cover (not shown) in place, a layer of sealant is applied to the lower skin 8 and then the lower skin is moved to its required position and secured in place using clamps or jigs. The cover is then removed, part way through the curing of the sealant, so the sealant is firm enough to no longer seep into the threads 48, but not hard enough to make removal of the cover more difficult. FIG. 7 shows the upper fixing 12 with the lower wing skin 8 in the required location, after removal of the cover.

As shown in FIG. 7, the pilot hole 54 in the lower wing skin 8 is misaligned with the threaded opening 26. More particularly, the axis 56 of the pilot hole 54 is offset from the axis 58 of the threaded opening 26. Accordingly, even if the pilot hole 54 was not undersized it would not be possible to insert a fastener 16 (that was large enough to engage the threads of the threaded opening 26) through the lower wing skin 8 and into the threaded opening 26. However, the pilot hole 54 being undersized means that the lower wing skin 8 can be drilled over the top of the pilot hole 54 but not concentric therewith, so as to enlarge the pilot hole to the required size and also shift the position of the hole so that it is aligned with the threaded opening 26. In this embodiment the threaded opening has a diameter, including the diametric extent of the thread, of 12 mm whereas the pilot hole has a diameter of 8.5 mm, i.e. 3.5 mm smaller. In other words, the pilot hole 54 is around 70% of the diameter of the threaded opening. With the pilot hole being 3.5 mm smaller in diameter than the threaded opening 26, the method of this embodiment can accommodate the axis of the pilot hole 54 being offset by up to 1.75 mm. This amount of offset is what is shown in FIG. 7.

Figure 8:
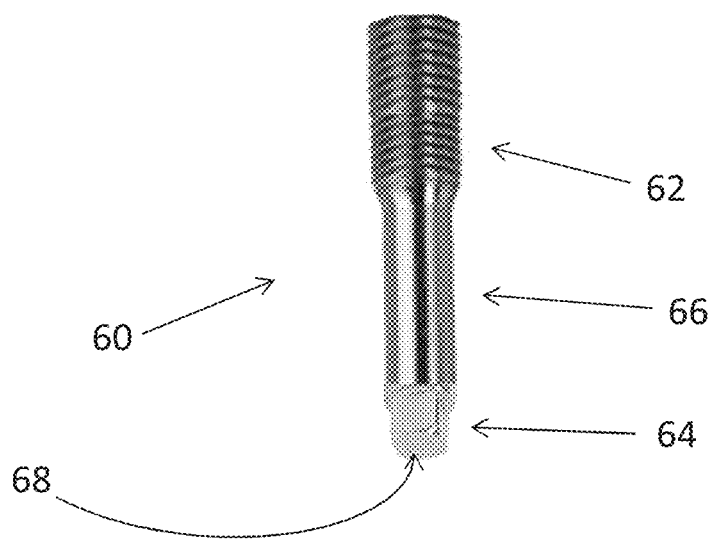
FIG. 8 shows a perspective view of an alignment projection.
Figure 9:
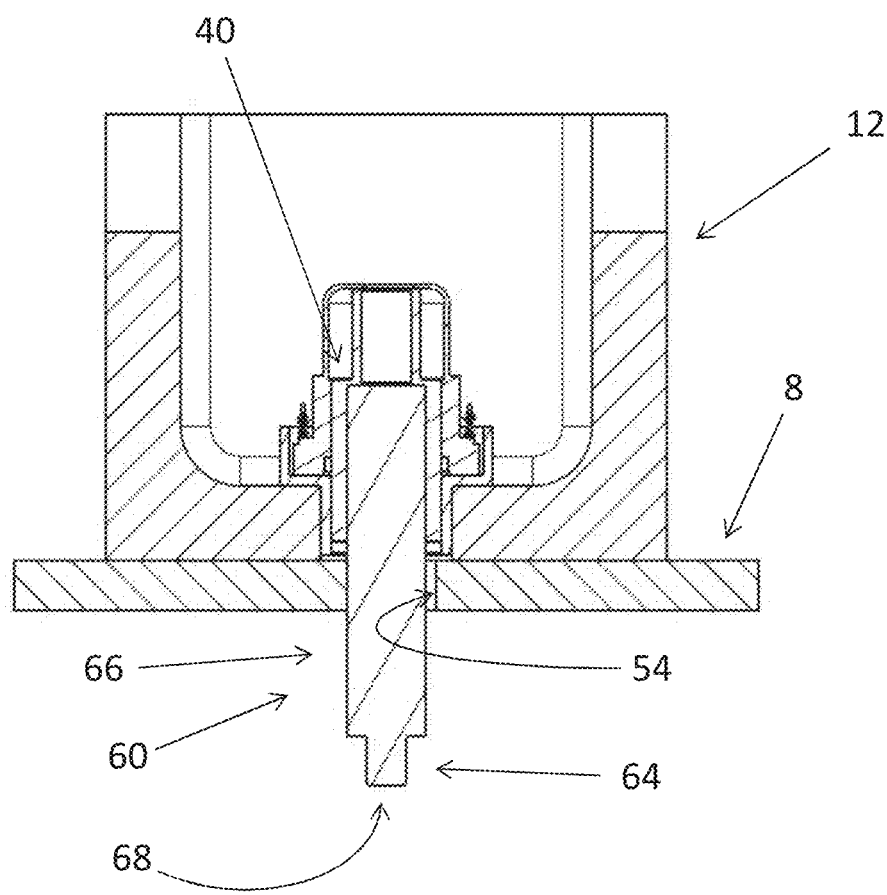
FIG. 9 shows a cross-sectional view of the alignment projection of FIG. 8, attached to the alignment insert and projecting through the pilot hole of the lower wing skin.

As discussed above, the purpose of the alignment insert 40 is to guide the drilling of the lower wing skin 8 to enlarge the pilot hole 54 and reposition it in alignment with the threaded opening 26. In this embodiment, the alignment insert 40 guides the drilling via an alignment projection which is attached to the alignment insert 40, in this particular case after the lower wing skin 8 has been placed in the required position, and projects through the pilot hole 54. FIGS. 8 and 9 show the alignment projection 60, in isolation and attached to the alignment insert 40 respectively.

One end of the alignment projection 60 has an alignment projection thread 62, which in this case is male left hand thread that is complementary to the female thread 48 of the alignment insert 40. A formation 64 for engaging a driving tool, which terminates in an end face 68, is provided at the other end of the alignment insert 60. An elongate shank 66 extends between the ends of the alignment projection 60.

The alignment projection 60 is attached to the alignment insert 40 by inserting the end of the projection 60 with the thread 62 through the pilot hole 54 and into the bore 46 in the alignment insert 40, screwing it in (anticlockwise) to engage the thread 62 of the projection with the thread 48 of the insert 40, until it abuts the shoulder 50.

Figure 10:
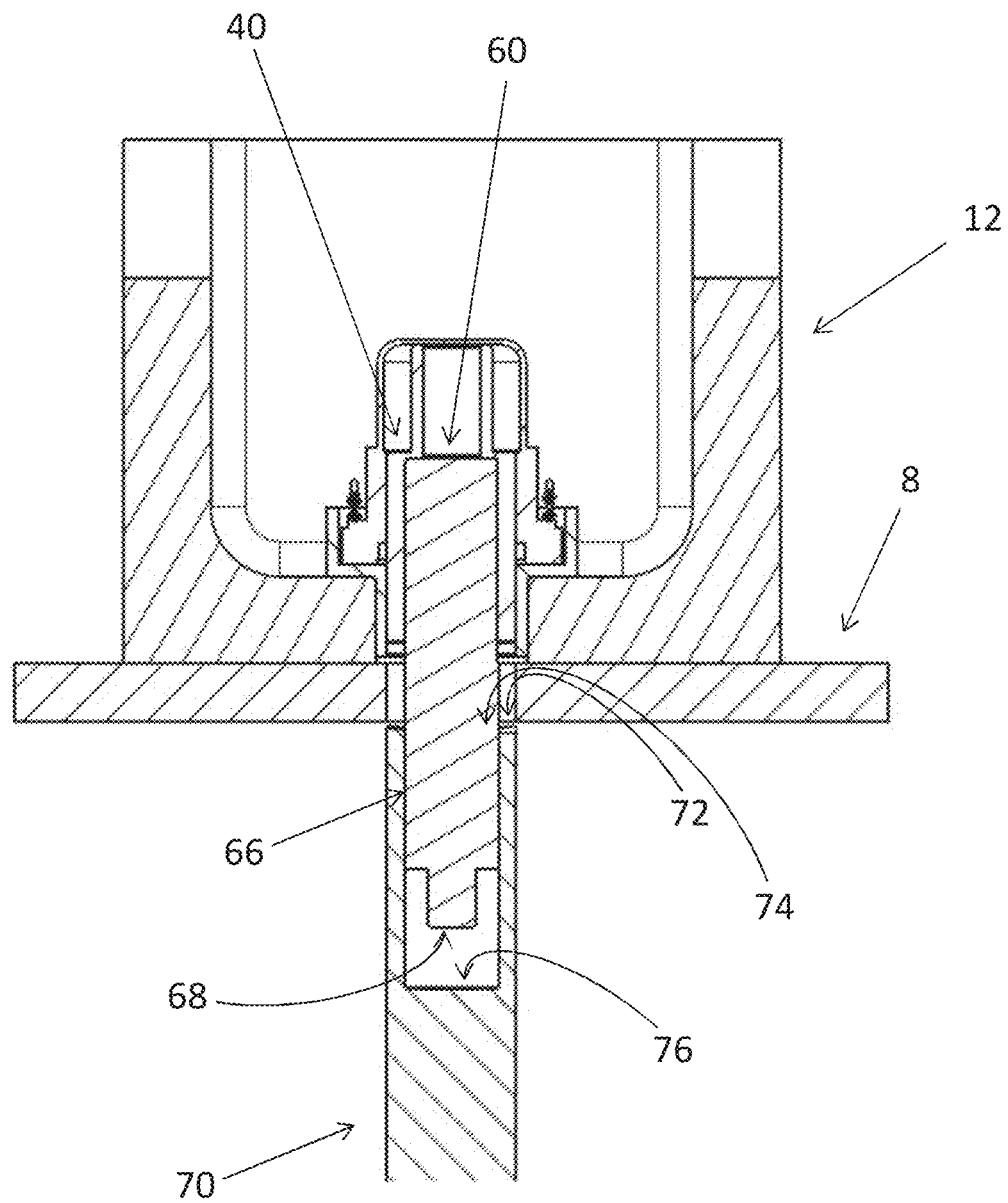
FIG. 10 shows a cross-sectional view of a step of drilling the lower wing skin under guidance of the alignment insert.

The alignment projection 60 of this embodiment physically guides the drill which is drilling the lower wing skin 8. This is shown in FIG. 10. The drill 70 has an annular cutting edge 72 encircling a central bore 74, in a manner akin to a hole saw. The central bore terminates in a bottom surface 76. To drill the lower wing skin 8, the drill 70 is introduced to the components 12, 8 in a manner which inserts the formation 64 and part of the shank 66 of the alignment insert 60 into the bore 74. The shank 66 and bore 74 are a close fit, therefore the drill 70 is constrained to move along the alignment projection. The drill is thus guided so that it remains in alignment with the threaded opening 26. The drill 70 continues to be advanced, inserting more and more of the shank 66 of the alignment projection 60 into the bore 74 of the drill, and is rotated about its longitudinal axis. This moves the rotating cutting edge progressively through the thickness of the lower wings skin 8, drilling it.

Once the cutting edge 72 of the drill breaks through the upper surface of the lower wing skin 8, it enters the 1 mm gap beneath the alignment insert 40 which is provided by that component being recessed behind the lower surface of the upper fitting 12. At that point, the end face 68 of the alignment projection 60 abuts the bottom surface 76 of the bore 74 of the drill. Those surfaces act as stop surfaces, preventing the drill 70 from over-penetrating, i.e. travelling too far upwards and cutting into the alignment insert 40.

It is noteworthy that in this embodiment the drill 70 is rotated anticlockwise, i.e. in the same direction as the alignment projection thread 62. Accordingly, any transfer of torque from the drill 70 to the alignment projection 62 acts to tighten the attachment of the alignment projection 60 to the alignment insert 40.

Figure 11:
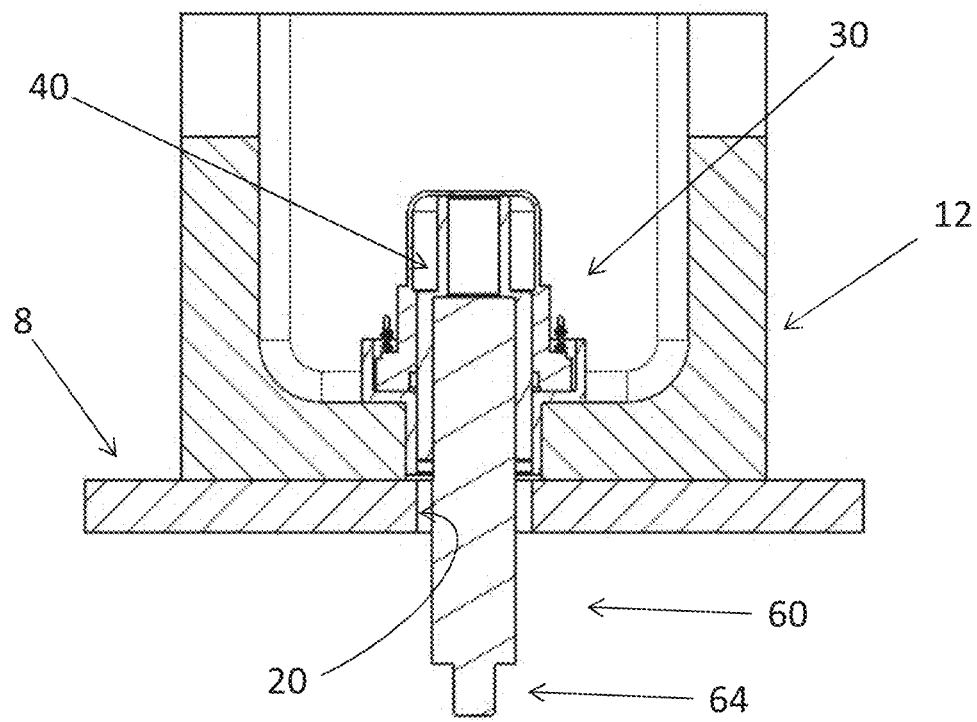
FIG. 11 shows a cross sectional view of the upper fitting and lower wing skin after drilling.
Figure 12:
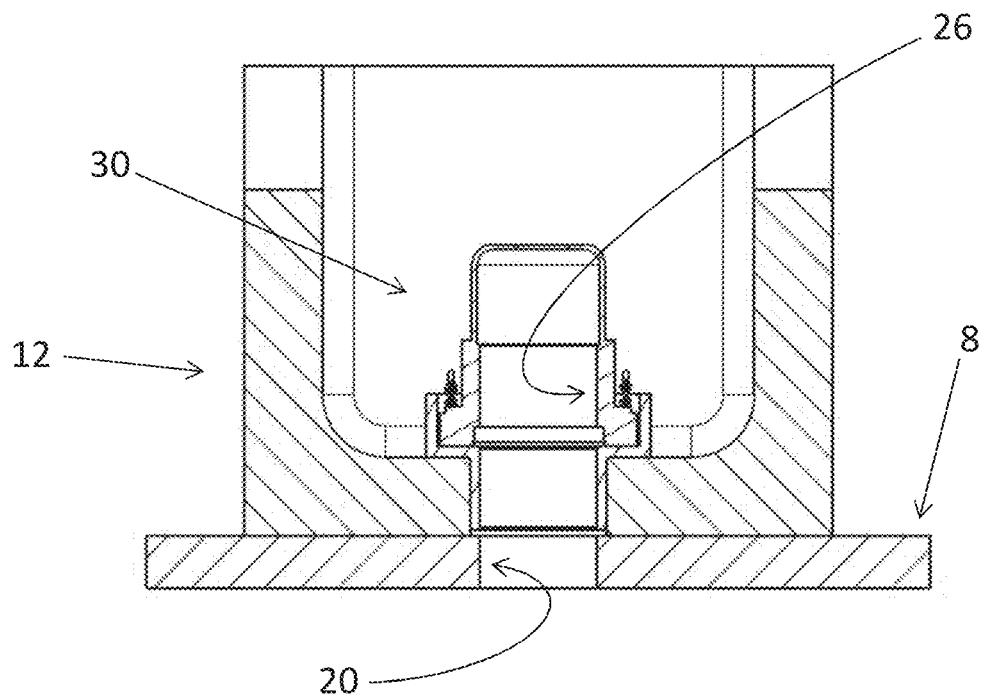
FIG. 12 shows a cross-sectional view of the upper fitting and lower wing skin after drilling of the lower wing skin, with the alignment insert and alignment projection removed.

After the lower wing skin 8 is drilled, it has a hole 20 which is of the correct size for a fastener 16 to be inserted through it, and which is aligned with the threaded opening 26 such that such a fastener 16 inserted through the hole 20 could then engage the threaded opening. This is shown in FIG. 11. The alignment projection 60 and alignment insert 40 are then removed from the captive nut 30 to make room for such a fastener 16. In this embodiment, both insert 40 and projection 60 are removed in a single action, using a driver engaged with the formation 64 to rotate the alignment projection 60 anticlockwise. This tightens the engagement between the alignment projection thread 62 and the female thread 48 of the alignment insert. When sufficient torque is applied, the alignment projection 60 forces the alignment insert 40 to rotate anticlockwise, loosening the engagement between the male thread 52 of the insert 40 and the threaded opening 26 and backing the alignment insert out of the opening. The upper fitting 12 and lower wing skin 8, with the alignment insert 40 and alignment projection 40 removed therefrom, are shown in FIG. 12.

Figure 13:
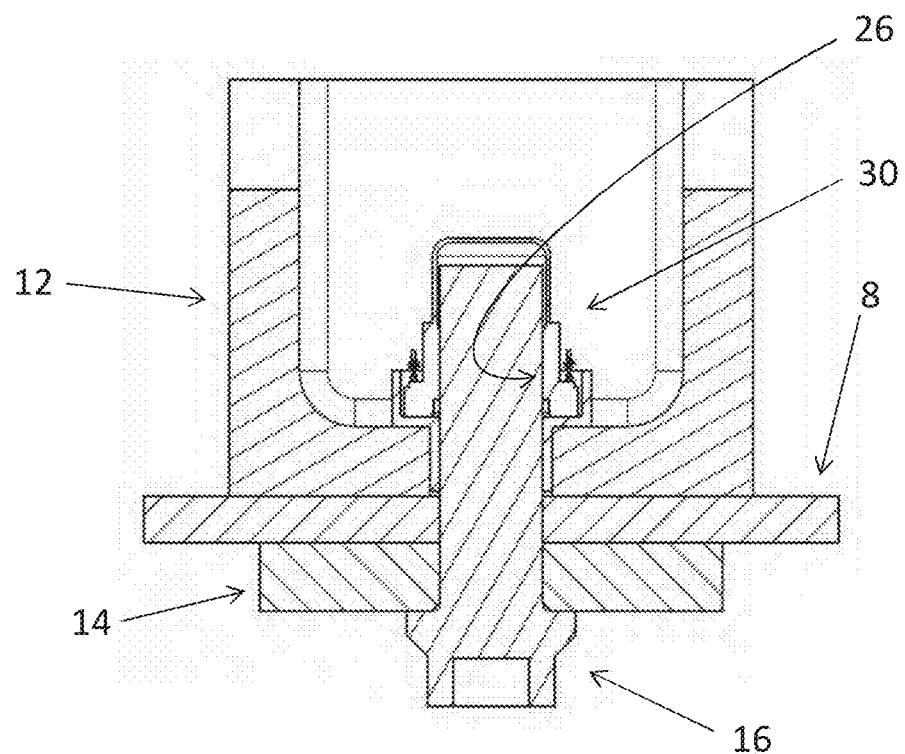
FIG. 13 shows a cross-sectional view of the upper fitting, lower wing skin and lower fitting joined with a bolt.

After drilling of the lower wing skin 8 and removal of the alignment insert 40 and alignment projection 60, the lower fitting 14 (with its hole 20 produced in the match-drilling discussed above) is reintroduced. A fastener 16 is then inserted through the hole 20 in the lower fitting, through the hole 20 in the lower wing skin 8 and into the threaded opening 26. The fastener 16 is then tightened within the threaded opening 26, clamping the three components together and completing the joint as shown in FIG. 13.

Other embodiments of the invention will be described below. It is to be understood that these embodiments are similar to the first embodiment, therefore only the differences will be described. Corresponding reference numerals denote corresponding features.

Figure 14:
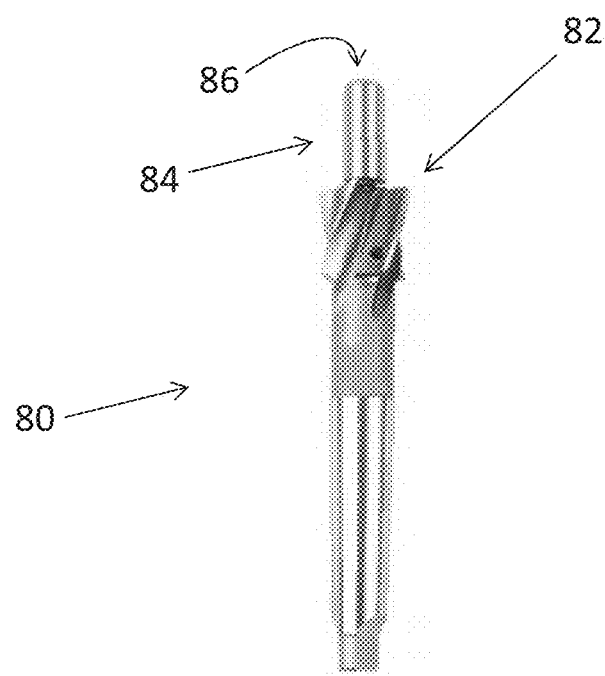
FIG. 14 shows a perspective view of a drill for use in a second embodiment of the invention.

FIG. 14 shows a drill 80 which in a second embodiment of the invention is used in place of the drill 70 described above. The drill 80 has an annular cutting edge 82 like the drill described above, but in this case the annular cutting edge 82 takes a form similar to a milling cutter. The annular cutting edge 82 encircles a non-cutting projection 84 which terminates in a domed end face 86. The non-cutting projection 84 can rotate relative to the cutting edge 82, and can also move axially relative to the cutting edge 82 between an extended position, shown in FIG. 14, and a retracted position in which it is partially received within the annular cutting edge 82. The non-cutting projection 84 is biased to the extended position by a spring (not visible).

To drill the lower wing skin 8 in this embodiment, the drill 80 is introduced to the components 12, 8 in a manner which inserts the non-cutting projection 84 of the drill 70 into the bore 46 of the alignment insert 40 (which may be threaded as described above, or may for example be smooth-walled or ribbed). The non-cutting projection 84 is a close fit with the bore 46 of the alignment insert 40, therefore the non-cutting projection 84 can only be inserted into the bore 46 to any significant extent when the drill 80 (in particular the annular cutting edge 82) is correctly aligned with the alignment insert 40 and by extension with the threaded opening 26. Thus, by receiving the non-cutting projection 84 the alignment insert 40 guides the drilling of the lower wing skin 8 directly. The drill 80 is rotated and advanced, inserting the non-cutting projection 84 further into the bore 46 of the alignment insert 40 and moving the cutting edge 82 progressively through the thickness of the lower wing skin 8. Due to the non-cutting projection 84 being rotatable relative to the cutting edge 82, and indeed the rest of the drill 80, while the drill 80 rotates the non-cutting projection is held rotationally stationary by friction between it and the bore 46.

Since the non-cutting projection 84 is biased to the extended position, drilling begins with it in that position. The non-cutting projection 84 stays in the extended position as it is inserted deeper into the bore 46 and as the cutting edge 82 begins to cut through the lower wing skin 8. Part way through the travel of the cutting edge 82 through the lower wing skin 8, the end face 86 of the non-cutting projection 84 contacts the shoulder 50 of the bore. The shoulder 50 prevents the non-cutting projection 84 from moving any further. As the drill 80 continues to be advanced and the cutting edge 82 continues through the lower wing skin 8, the non-cutting projection 84 moves backwards relative to the annular cutting edge 82 towards the retracted position, against its bias.

Once the cutting edge 82 of the drill breaks through the upper surface of the lower wing skin 8, it enters the gap beneath the alignment insert 40 which is provided by that component being recessed behind the lower surface of the upper fitting 12 as discussed above. Also at that point, the non-cutting insert reaches the retracted position and can move no further. The end face 86 of the non-cutting projection 84 and the shoulder 50 of the bore 46 then act as stop surfaces, with their abutment preventing over-penetration of the drill 80.

Figure 15:
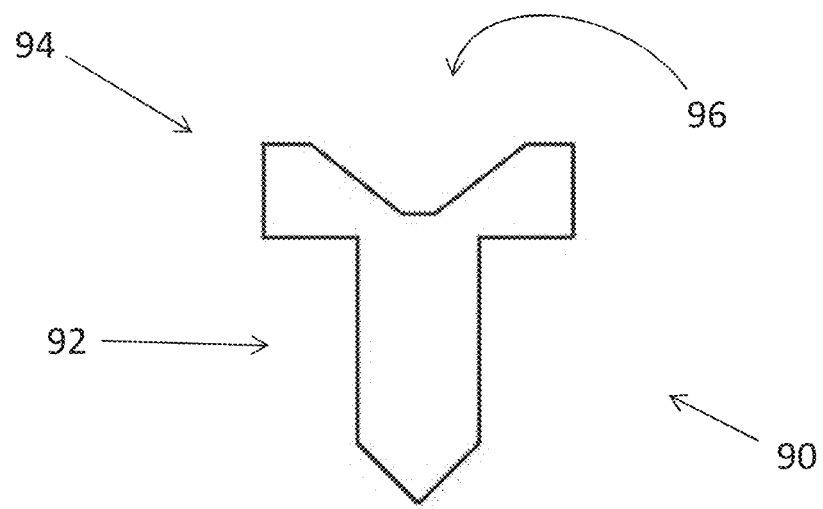
FIG. 15 shows a cross-sectional view of an optical target structure for use in a third embodiment of the invention.

In a third embodiment of the invention the alignment insert 40 supports an alignment projection in the form of an optical target structure, which is shown in FIG. 15. The optical target structure 90 has a shank 92 and a head 94 which supports an optical target 96. The shank 92 in inserted through the pilot hole 54 in the lower wing skin 8 and into the bore 46 of the alignment insert 40 to attach the target structure 90 to the alignment insert. The head 94 remains beneath the bottom of the lower wing skin 8, where it is visually accessible.

In the third embodiment the drill (not shown) is a CNC tool with a guidance system, and has a laser diode and light sensor. With the laser diode generating a laser beam, the drill undergoes movement in a search pattern until it identifies the position in which the laser beam strikes the centre of the optical target 96 while perpendicular thereto (laser light from the laser diode, reflected by the optical target 96, being detected most strongly by the light sensor when in that position). When it reaches that position, the guidance system records the path in space along which the laser beam is shining, and identifies that path as an axis along which the lower wing skin 8 should be drilled. The optical target structure 90 is then removed, and the guidance system controls the path of the drill so that the hole formed thereby is concentric with the axis (and thus aligned with the threaded opening 26). Accordingly, in this embodiment the alignment insert 40 guides the drilling of the lower wing skin 8 in that the insert determines the position and orientation of the optical target 96 which, in turn, is used by the guidance system to determine the desired path along which drilling should take place.

In this particular embodiment, the drill performs orbital drilling, i.e. drilling in which a cutting tool follows an orbital path around a central axis (which in this case is the axis identified by the guidance system). The details of orbital drilling will be readily apparent to the skilled person therefore no further detail will be provided here.

Figure 16:
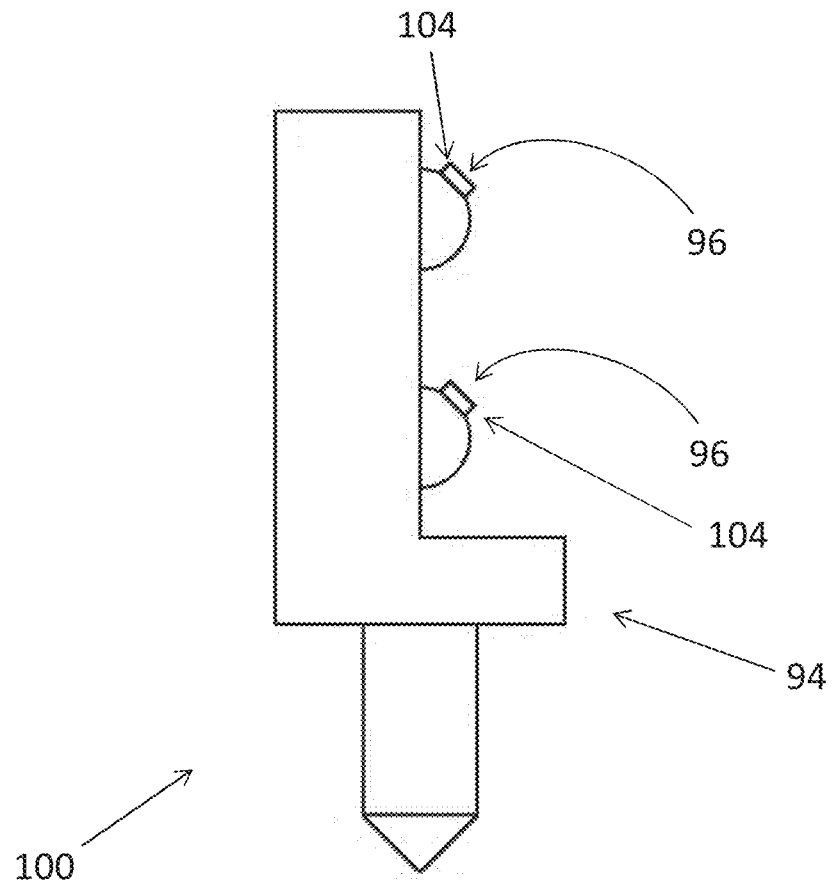
FIG. 16 shows a side view of an optical target structure for use in a fourth embodiment of the invention.

FIG. 16 shows an alternative optical target structure 100, according to a fourth embodiment of the invention. Like that of the third embodiment, the target structure 100 of this embodiment has a shank 92 for insertion into the alignment insert 40 through the pilot hole 54, and a head 94. In this embodiment the head 94 has a hemicylindrical extension 102 with two diagonally-positioned optical targets 96, each of which is surrounded by a shroud 104. The two optical targets 96 are positioned on the centreline of the shank 92.

The optical target structure 100 of the fourth embodiment functions in much the same way as that of the third embodiment, except that the drill determines the positions of the two optical targets 96 in a manner akin to a laser rangefinder, rather than aligning itself with either one of them. Having calculated the positions of the two targets 96, the guidance system calculates the position of an axis which would intersect them. This axis is also the centreline of the shank 92, and thus of the alignment insert 40 and the threaded opening 26. The axis therefore denotes the path which should be followed by the drill when drilling the lower wing skin 8.

Figure 17:
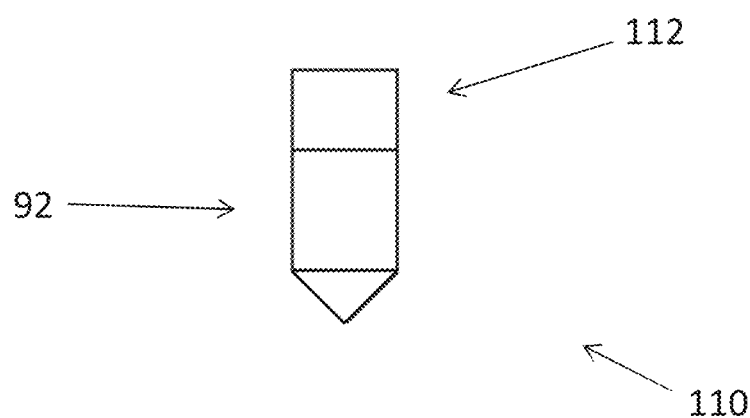
FIG. 17 shows a side view of a magnetic target structure for use in a fifth embodiment of the invention.

In a fifth embodiment of the invention, the alignment insert supports a magnetic target structure as shown in FIG. 17. The magnetic target structure 110 has a shank 92 like the magnetic target structures of the third and fourth embodiments, but rather than a head the shank has a magnet 112 on its end. The magnetic target structure 110 does not project through the pilot hole 54 in the lower wing skin 8, but instead is received fully within the bore 46 of the alignment insert.

The guidance system of the drill of this embodiment does not have a laser or light sensor, but instead has a magnetic tracker with a drill bit aperture. Further, the guidance system of this embodiment is separate from the drill. With the magnetic target structure 110 in position within the alignment insert 40, and the lower wing skin 8 in the required location, the magnetic tracker is positioned in the approximate location of the magnetic target structure. Sensors within the magnetic tracker analyse the magnetic field in that region and use the data to ascertain the position of the magnet 112 then automatically move the drill bit aperture so as to align it with the magnet 112, in the same manner as is used in drilling using a through skin sensor ("TSS"). The bit of a drill is then passed through the drill bit aperture and through the lower wing skin 8 to produce a hole aligned with the magnet, and thus with the threaded opening 26.

Whilst the present invention has been described and illustrated with reference to particular embodiments, it will be appreciated by those of ordinary skill in the art that the invention lends itself to many different variations not specifically illustrated herein. By way of example only, the above embodiments use threaded fasteners in the form of bolts, whereas in other embodiments each threaded fastener may take the form of a threaded stud with a nut. In such embodiments, the step of tightening the fastener may be performed by screwing that nut up the stud. As another example, while in the first embodiment the alignment projection is inserted into the alignment insert through the pilot hole in the lower wing skin, in other embodiments the alignment projection may already be in place and then the lower wing skin may be introduced and its pilot hole placed around the alignment projection. As a further example, the shank of the alignment projection may include fluting in which swarf from the drilling process can be accommodated and along which that swarf can be removed from the area being drilled. As another example, the end face of the alignment projection of the first embodiment may be domed so as to avoid the corners of the formation gouging the bottom surface of the bore of the drill.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The term 'or' shall be interpreted as 'and/or' unless the context requires otherwise.

The invention claimed is:

1. A method of joining first and second components of an aircraft structure, the method comprising:
   providing a threaded opening in the first component;
   attaching an alignment insert to the threaded opening before, during or after locating the second component relative to the first component in a required position; then
   holding the alignment insert in a stationary position using the threaded opening in the first component, and drilling a hole in the second component in a position determined by the alignment insert; and subsequently inserting a threaded fastener through the hole in the second component and into the threaded opening, and tightening the fastener to join the first and second components.

2. A method according to claim 1, wherein said components are parts of a wing assembly.

3. A method according to claim 1, wherein the step of providing the threaded opening in the first component includes fixing a nut to the first component.

4. A method according to claim 1, wherein the method further comprises match-drilling the first component and a third component to form holes therein;
   the threaded opening is provided in said hole in the first component; and
   said fastener is inserted into the threaded opening through said hole in the third component as well as through the hole in the second component.

5. A method according to claim 1, further comprising attaching an alignment projection to the alignment insert so that the alignment projection can extend through a pilot hole in the second component, the alignment insert guiding the drilling of the second component via the alignment projection.

6. A method according to claim 5, wherein the alignment insert has a first thread for engaging the threaded opening, and a second thread for engaging the alignment projection, the first and second threads running in opposite directions.

7. A method according to claim 5, wherein the alignment projection physically guides the drill drilling the hole in the second component.

8. A method according to claim 7, wherein the drilling of the hole in the second component is performed using a drill which has an annular cutting edge encircling a central bore, the alignment projection being received within the bore of the drill during said drilling.

9. A method according to claim 8, wherein the alignment projection engages the alignment insert via an alignment projection thread, and the drill rotates in the same direction as the alignment projection thread.

10. A method according to claim 8, wherein the central bore of the drill and the alignment projection each define respective stop surfaces, the stop surfaces abutting one another after drilling of the second component so as to prevent the drill from over-penetrating.

11. A method according to claim 1, wherein the drilling of the second component uses a drill comprising an annular cutting edge encircling a non-cutting projection, the non-cutting projection passing through a pilot hole in the second component and being guidingly received in the alignment insert during drilling of the second component.

12. A method according to claim 11, wherein the non-cutting projection defines a stop surface and the alignment insert or the first component defines another stop surface, the stop surfaces abutting one another after drilling of the second component so as to prevent the drill from over-penetrating.

13. A method according to claim 11, wherein the non-cutting projection of the drill is axially movable between extended and retracted positions relative to the annular cutting edge, and the non-cutting projection moves from the extended position to the retracted position in the course of drilling of the second component.

14. A method according to claim 1, wherein the alignment insert supports an optical target structure and drilling of the second component is performed by a drill using a guidance system, the guidance system controlling the path of the drill based on orientation information provided by the optical target structure.

15. A method according to claim 1, wherein the alignment insert supports a magnet and drilling of the second component is performed by a drill which using a guidance system, the guidance system controlling the path of the drill base on a sensed location of the magnet.

16. A method according to claim 1, wherein drilling of the second component is performed by orbital drilling.

17. A kit of parts for performing a method according to claim 3, the kit comprising the nut, the alignment insert and the fastener, the alignment insert and the fastener each having threads configured for engagement with the threaded opening of the nut.

18. An aircraft or part of an aircraft, comprising first and second components joined using the method of claim 1.

19. An aircraft or part of an aircraft, comprising first and second components joined using the kit of parts according to claim 17.

20. A method of attaching a first part of an aircraft structure to a second part of an aircraft structure, the method comprising:
- providing a female set of threads on the first part;
- mounting a drill guide to the female set of threads before, during or after introducing the second part to the first part; then
- holding the drill guide in a stationary position using the female set of threads, and drilling a hole in the second part in a position determined by the drill guide; and subsequently
- inserting a joining member with a male set of threads into the female set of threads through the hole in the second part, and tightening the joining member to clamp the first and second parts together.

* * * * *